US010389284B2

(12) United States Patent
Freire

(10) Patent No.: US 10,389,284 B2
(45) Date of Patent: Aug. 20, 2019

(54) CONTROL ARRANGEMENT OF A MULTI-STATOR MACHINE

(71) Applicant: Siemens Aktiengesellschaft, München (DE)

(72) Inventor: Nuno Miguel Amaral Freire, Brande (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 15/463,695

(22) Filed: Mar. 20, 2017

(65) Prior Publication Data

US 2017/0279391 A1 Sep. 28, 2017

(30) Foreign Application Priority Data

Mar. 24, 2016 (EP) .................................... 16162139

(51) Int. Cl.
*H02P 9/24* (2006.01)
*H02P 9/42* (2006.01)
(Continued)

(52) U.S. Cl.
CPC ................ *H02P 9/42* (2013.01); *H02P 9/105* (2013.01); *H02P 21/05* (2013.01)

(58) Field of Classification Search
CPC .......... H02P 29/024; H02P 29/02; H02P 6/12; H02P 21/00; H02P 21/24; H02P 25/22
See application file for complete search history.

(56) References Cited

U.S. PATENT DOCUMENTS 6,359,415 B1 3/2002 Toshiba
9,172,317 B2 10/2015 Ishida et al.
(Continued)

FOREIGN PATENT DOCUMENTS

CN 1284213 A 2/2001
CN 103501138 A 1/2014
(Continued)

OTHER PUBLICATIONS

Non-English Chinese Office Action for Application No. 201710182778. 2, dated Jan. 2, 2019.

*Primary Examiner* — Bickey Dhakal
(74) *Attorney, Agent, or Firm* — Schmeiser, Olsen & Watts LLP

(57) ABSTRACT

A control arrangement of a multiple-stator machine, comprising a frequency converter for each of the plurality of stators and a controller for each frequency converter, wherein a controller of a frequency converter is realized to generate control signals for that frequency converter on the basis of current values relating to that stator, and to generate a compensation current value for a further controller on the basis of the received current values in the event of an open-circuit fault in a frequency converter; to receive a compensation current value from a further controller; and to compute a voltage reference for a subsequent transform stage of the controller on the basis of the received current values is provided. The invention further describes a current control module of a frequency converter controller of such a multi-stator machine; a multi-stator machine; and a method of performing fault-tolerant control of a multi-stator machine.

13 Claims, 9 Drawing Sheets

(51) Int. Cl.
*H02P 9/10* (2006.01)
*H02P 21/05* (2006.01)

(56) References Cited

U.S. PATENT DOCUMENTS

| | | | |
|---|---|---|---|
| 9,954,472 B2* | 4/2018 | Mori | H02P 21/14 |
| 2008/0309265 A1* | 12/2008 | Terada | H02P 21/06 |
| | | | 318/400.02 |
| 2010/0188055 A1 | 7/2010 | Patterson | |
| 2013/0200827 A1* | 8/2013 | Kezobo | H02P 29/0241 |
| | | | 318/400.21 |
| 2013/0299271 A1* | 11/2013 | Endo | B62D 5/046 |
| | | | 180/446 |

FOREIGN PATENT DOCUMENTS

| | | | | |
|---|---|---|---|---|
| EP | 2884657 A1 | 6/2015 | | |
| JP | WO 2015068258 A1 * | 5/2015 | | H02P 21/14 |

\* cited by examiner

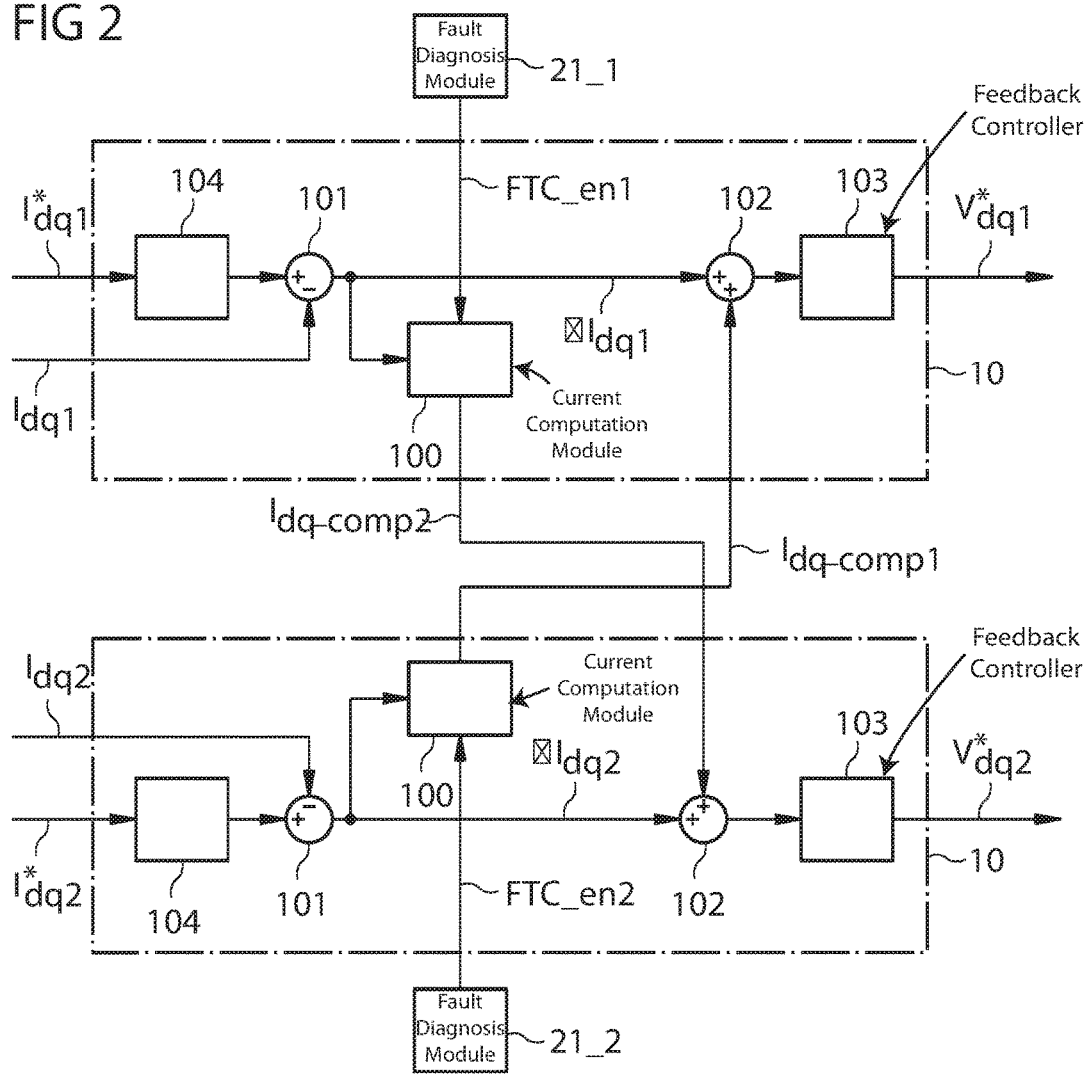
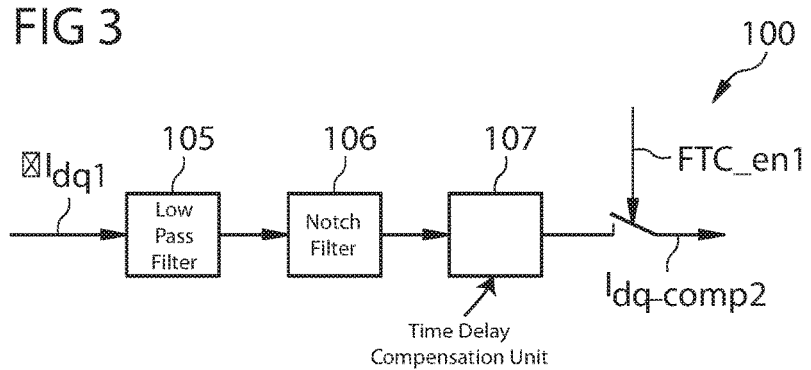

CONTROL ARRANGEMENT OF A MULTI-STATOR MACHINE

CROSS-REFERENCE TO RELATED APPLICATIONS

This application claims priority to EP Application No. 16162139.6, having a filing date of Mar. 24, 2016, the entire contents of which are hereby incorporated by reference.

FIELD OF TECHNOLOGY

The following describes a control arrangement of a multi-stator machine; a current control module of a frequency converter controller for a frequency converter of a stator in a multi-stator machine; and a method of performing fault-tolerant control of a multi-stator machine.

BACKGROUND

In a permanent magnet synchronous generator (PMSG), the excitation field is provided by permanent magnets, and the frequency of the voltages induced in the stator is directly related to the rotation rate of the rotor hub. Owing to its performance reliability, a PMSG is often the generator of choice for offshore wind energy applications. The stator can be realized as a multiple-stator machine with isolated neutral points, in which each stator winding carries a plurality of phases (usually three). A multi-stator machine may be preferred in order to achieve fault-tolerance in a demanding application such as offshore wind farm.

To convert the variable frequency of a PMSG into a constant grid frequency, a generator-side frequency converter and a grid-side frequency converter can be used in a back-to-back arrangement joined by a DC link. A frequency converter is generally realized as an arrangement of power switches such as isolated gate bipolar transistors (IGBTs) on account of their ability to switch high voltages at rapid switching frequencies. A non-switching IGBT—the result of an open-circuit fault in the power switch transistor—is one of the main causes for power converter outage in PMSG wind turbines. When a power switch fails, the corresponding generator phase currents become distorted or erratic, leading to a significant increase in torque ripple. While a slight amount of torque ripple is acceptable and indeed even unavoidable during normal fault-free or "healthy" operation of a PMSG, the significantly higher levels of torque ripple that develop after a fault cause vibrations which may in fact cause damage to the generator or to other components.

One of the advantages of a multi-phase PMSG wind turbine generator is its ability to carry on operating even with one or more open-circuit faults in its generator-side converter. In the case of multi-stator PMSG with multiple isolated neutral points, the appropriate winding (i.e. all phases) is generally taken out of service. However, this results in a significant decrease in power output, with a corresponding loss in revenue.

SUMMARY

An aspect relates to providing an improved way of reacting to an open circuit fault in a machine of the type described above.

This aspect is achieved by the control arrangement of claim 1; by the current control module of claim 4; by the multiple-stator machine of claim 10; and by the method of claim 12 of performing fault-tolerant control of a multiple-stator machine.

The inventive control arrangement is intended for use in a multiple-stator machine that comprises a frequency converter for each of the plurality of stators, and a frequency converter controller for each frequency converter. The purpose of a frequency converter controller is to generate control signals for that frequency converter on the basis of input signals (input references, performance parameters etc.) relating to that stator. According to embodiments of the invention, each controller is realized to receive a measurement current value and a reference current value for that stator, and to generate a compensation current value for the current control module of another, identical frequency converter controller of the control arrangement on the basis of the current value and reference current value in the event of an open-circuit fault in one or more of the frequency converters. To this end, the controllers are realized to exchange compensation current values in the event of an open-circuit fault. In other words, each current control module generates a compensation current value for another current control module, and receives a compensation current value from another current control module. The voltage reference for a subsequent transform stage of a controller is therefore computed on the basis of the received current values and the received compensation current value.

The frequency converter shall be understood to comprise the generator-side converter of a multiple-stator machine. As the skilled person will know, frequency conversion between such a multiple-stator machine and a grid is generally achieved by a generator-side converter and a grid-side converter, connected together by a DC link.

Each stator of a multiple-stator machine will carry windings for a number of phases, usually three. Therefore, in the context of embodiments of the invention, the term "current value" should be understood to mean current values relating to each of the phases of that stator. For example, a "measurement current" received by a controller can in fact comprises three measured or observed current values, one for each of the phases of a three-phase winding. The "compensation current" in the context of embodiments of the invention is the error between the reference currents and the currents actually observed in a converter. In a healthy converter, these values will generally be quite close. In a faulty converter, at least one pair of reference and observed currents will differ significantly. By exchanging compensation currents in the inventive control method, the error seen in one controller is also "injected" into the controller of a healthy frequency converter. The poor performance of a faulty converter (which would otherwise result in significant torque ripple) is effectively shared with another, healthy frequency converter. The torque ripple caused by the healthy converter can effectively be symmetric to the torque ripple generated by the faulty converter, so that torque ripple arising from an open-circuit fault can advantageously be reduced or even eliminated.

An advantage of the control arrangement according to embodiments of the invention is that the improved post-fault control of the machine does not require any significant or costly hardware modifications or reconfiguration of the existing controller design. The improved fault-tolerant control can be effected largely in software, by appropriate handling of the relevant signals to ultimately generate power switch control signals that lead to a smoother operation with a favourably minimized level of torque ripple.

The inventive post-fault control is based on the following insights: an open-circuit fault of an IGBT results in failure of the power switch; when such an open-circuit fault occurs, there is still an alternative path available for the current, namely through the rectifier diode of the faulty switch; and each converter contributes essentially equally towards machine torque. Embodiments of the present invention takes advantage of the multiple-stator machine design, and makes adjustments to the control of one or more of the "healthy" power converters to compensate or counteract the behaviour of the faulty converter(s), with the result that torque ripple is favourably minimized. In this way, a fault-tolerant machine can be achieved in a very cost-effective manner. In the context of embodiments of the invention, the expression "fault tolerant-machine" refers to a multi-stator machine that can continue to operate, even in the event of one or more open-circuit faults in a frequency converter, at an acceptable level of performance. In other words, with the control method according to embodiments of the invention, there is no need to shut down the machine when an open-circuit fault occurs. Instead, the machine can continue to operate at an acceptable performance level until the fault can be repaired.

According to embodiments of the invention, the current control module comprises a number of inputs for receiving values of measured current and reference current, and a comparator for determining a difference between them. The purpose of the current control module of a frequency converter is to provide a voltage reference that will be used to generate control signals for the power switches of the frequency converter. In the current control module according to embodiments of the invention, the computation unit is realized to compute the voltage reference on the basis of the current difference, and also on an input compensation current value received from the current control module of another frequency converter in the event of an open-circuit fault in that other frequency converter. The current control modules are effectively realized to exchange compensation current values. To this end, a current control module comprises a computation module for computing an output compensation current value—for sending to another current control module—on the basis of the current difference in the event of an open-circuit fault in its frequency converter.

An advantage of the inventive current control module is that it can adjust the behaviour of its healthy frequency converter to compensate for the poor behaviour of another faulty frequency converter. Equally, the inventive current control module can "receive assistance" from another, healthy frequency converter when its own frequency converter has reported an open-circuit fault.

According to embodiments of the invention, the multiple-stator machine comprises a plurality of stators, a frequency converter for each of the plurality of stators, and a controller for each frequency converter. In the inventive multiple-stator machine, each frequency converter controller comprises an instance of the inventive current control module.

The inventive multiple-stator machine is particularly suited for realization as a permanent magnet synchronous machine operating as a generator, for example in a wind turbine.

According to embodiments of the invention, the method of performing fault-tolerant control of such a multi-stator machine comprises the steps of providing a controller with an observed current value and a reference current value relating to its stator; generating a compensation current value on the basis of the received current values; monitoring the frequency converters to detect an occurrence of an open-circuit fault; exchanging compensation current values between controllers in the event of an open-circuit fault; and computing a voltage reference for a transform stage of a controller on the basis of the received observed current value, reference current value and compensation current value.

Post-fault control of the machine is achieved by exchanging compensation current values between the current control modules essentially as soon as an open-circuit fault has been detected in one or more of the frequency converters. Unlike conventional post-fault control strategies, the method according to embodiments of the invention does not call for a complete three-phase winding to be taken out of service. The inventive control method can be realized with only minor adaptations to an existing control strategy, more specifically in the software of an existing control strategy.

Particularly advantageous embodiments and features of embodiments of the invention are given by the dependent claims, as revealed in the following description. Features of different claim categories may be combined as appropriate to give further embodiments not described herein.

In the following, it may be assumed that the multiple-stator (or just "multi-stator") machine is a generator of the PMSG type described above. In the following therefore, but without restricting embodiments of the invention in any way, the inventive multi-stator machine may be assumed to be a PMSG of a wind turbine. Also, the terms "control arrangement" and "fault-tolerant control arrangement" may be used interchangeably, since the control arrangement according to embodiments of the invention is specifically conceived to allow the multi-stator machine to continue operating even after a fault has occurred. Embodiments of the invention is specifically concerned with an improved way of responding to an open-circuit fault in a frequency converter of a multi-stator machine. Therefore, the terms "frequency converter fault", "open-circuit fault" and "fault" may be assumed to have the same meaning and may be used interchangeably in the following.

In the control of a machine such as a generator, it is common practice to collect or observe performance values in one domain, and to convert those values into another domain in order to simplify the calculations. A well-established approach is to perform the Park transformation and inverse Park transformation between a stationary "abc" reference frame and a synchronous rotating "dq0" reference frame. The "dq0" reference frame is also referred to as the direct-quadrature-zero reference frame. In the following, the suffixes (e.g. $i_{abc}$, $V_{dq}$) denote the relevant reference frame in the usual way.

The control method according to embodiments of the invention is preferably implemented as a computer program product in the usual manner, comprising functional modules realised using suitable algorithms for processing various inputs and generating various outputs. To this end, any analogue current and voltage signals required by the control method are converted into digital values for processing by the functional modules of the control arrangement. In the following, therefore, the terms "current", "current value" and "current signal" may be understood to have the same meaning and may be used interchangeably. The same applies to the terms "voltage", "voltage value" and "voltage signal".

Fault diagnosis may be performed in any suitable manner using any one of several methods known from the prior art. It may be assumed that a wind turbine of the type discussed herein is already equipped with an appropriate fault diagnosis arrangement that provides a suitable indication upon the occurrence of an open-circuit fault in one or more of the frequency converters.

The control arrangement according to embodiments of the invention can be implemented for a multi-stator machine with two or more stators. In a preferred embodiment of the invention, the multi-stator machine is a dual-stator machine, i.e. it has two stators. In this embodiment, the control arrangement comprises a first frequency converter controller for the frequency converter of a first stator, and a second frequency converter controller for the frequency converter of a second stator. The first controller receives a first compensation current value from the current control module of the second controller, and generates a compensation current value for the current control module of the second controller. Similarly, the second controller receives a second compensation current value from the current control module of the first controller and generates a compensation current value for the current control module of the first controller. In other words, the two current control modules are "exchange partners" and exchange or "swop" compensation current values in the event of an open-circuit fault in a frequency converter. In this way, the occurrence of an open-circuit fault in the first converter results in a non-zero compensation current for the second controller, while an open-circuit fault in the second converter results in a non-zero compensation current for the first controller.

An electrical machine such as a multi-stator PSMG generally avails of some kind of fault-detection circuitry to detect and report the occurrence of a fault. In a preferred embodiment of the invention therefore, the control arrangement comprises a fault diagnosis module realized to detect the occurrence of an open-circuit fault in a converter, and to generate an activation signal in the event of an open-circuit fault. The fault diagnosis module can detect a fault in a generator-side frequency converter by continuously monitoring the winding currents. A variety of other approaches may used to fulfil the diagnostic function, for example a voltage monitoring approach may be used, or a hardware-based solution, etc. During fault-free operation, the activation signal can have a default value of zero, or logic low. In an open-circuit fault in one or more IGBTs, the activation signal of the corresponding frequency converter toggles to logic high, and is used to "enable" the compensation current value computed by the appropriate current control module and make that signal available to the "exchange partner" of that current control module. The current control modules thus generate adjusted voltage references, which in turn result in adjusted control signals to the power switches of the relevant frequency converters. The fault-tolerant control is thus activated. The inventive fault control method can handle the failure of several power switches, up to a maximum of the phase count. For a three-phase system, therefore, the inventive fault control can handle up to three faulty power switches or IGBTs.

The compensation current computation module of the current control module according to embodiments of the invention preferably analyses the difference in expected or reference current and observed current values. These values are continuously fed to the current control units of the control arrangement. The compensation current computation module can generate a compensation current signal on the basis of this difference. Generally, a real or observed current will rarely correspond exactly to the reference current. Therefore, the compensation current computation module preferably outputs its compensation current signal only when the occurrence of an open-circuit fault has been established. In the absence of a fault, the value of a compensation current signal is preferably zero by default and has no effect on the computation of a reference voltage.

Preferably, the compensation current computation module comprises a filter arrangement to process the difference (or error) current. For example, in a preferred embodiment of the invention, the filter arrangement comprises a low-pass filter, since high-frequency components are not relevant for torque control. The low-pass filter can also ensure that the harmonic content of the compensation current is within the bandwidth of a feedback controller of the current control module. For example, the low-pass filter cut-off frequency may be set to ten times the generator electrical frequency, since main harmonics introduced by open-circuit faults into the dq0 current are the first and second harmonic for single and phase open-circuit faults, respectively. In a further preferred embodiment of the invention, the filter arrangement comprises a notch filter that serves to exclude a certain harmonic from compensation. This might be desirable depending on how the current reference is computed. For example a current reference may be calculated by a DC-link voltage controller, so that a notch filter is required to remove the harmonic component introduced by the DC-link voltage during post-fault operation. Preferably, any of these filters are realized using adaptive filters.

In a preferred embodiment of the invention, the compensation current computation module comprises a delay unit for introducing a time delay on the output compensation current value. The time delay is preferably chosen to account for system delays and/or a winding configuration, so that when the compensation current issued by one current control module is received by another current control module, it can simply be added to the difference current of that other current control module. This sum is then fed to a feedback controller, for example a proportional-integral controller, to generate the output reference voltage of that other current control module.

When a fault is detected, the control arrangement according to embodiments of the invention allows the machine to continue operating without any interruption. In the case of a generator such as a wind turbine generator, the fault-tolerant control method preferably comprises a step of derating the power output of the generator in the event of a fault. The inventive post-fault control ensures that the torque ripple is kept to favourable minimum in the event of an open-circuit fault in one or more of the frequency converters. Therefore, in a particularly preferred embodiment of the invention, the power output of the generator is de-rated by at most 20% of rated power until the fault can be remedied. The derating percentage depends to some extent on various machine parameters (e.g. inductances, magnetic flux), the ratio of faulty to healthy converters, and also on the number of faulty IGBTs. When two or more power switches fail, the required derating percentage with one faulty converter may be less than 20%.

BRIEF DESCRIPTION

Some of the embodiments will be described in detail, with reference to the following figures, wherein like designations denote like members, wherein:

FIG. 1 shows an embodiment of the control arrangement;
FIG. 2 shows an embodiment of a current control module;
FIG. 3 shows a first embodiment of a compensation current computation module in the current control module of FIG. 2;
FIG. 4 shows graphs of current and torque achieved using a control arrangement;
FIG. 5 shows graphs of current and torque achieved using a control arrangement;

In the diagrams, like numbers refer to like objects throughout. Objects in the diagrams are not necessarily drawn to scale.

DETAILED DESCRIPTION

Figure 1:
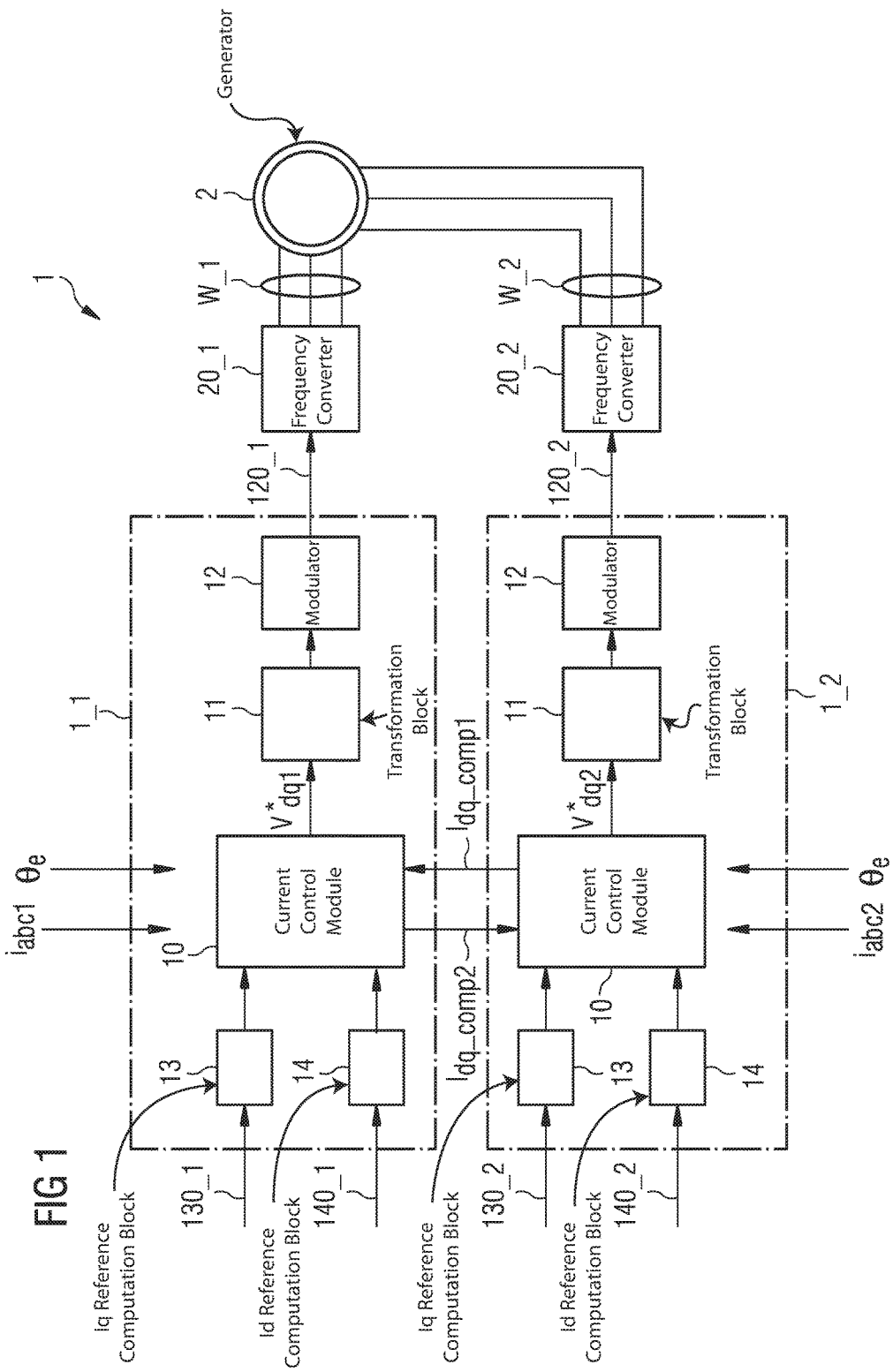

FIG. 1 shows an embodiment of the control arrangement 1 according to embodiments of the invention in use with a dual-stator PMSG 2. Each of the two stators has a set of windings W_1, W_2. The generator 2 has two frequency converters 20_1, 20_2, one for each stator. Each frequency converter 20_1, 20_2 is controlled by its own controller 1_1, 1_2. Each controller 1_1, 1_2 is supplied with appropriate input signals such as a power reference, rotor position $\theta_e$, a DC voltage reference, measured values of winding current $i_{abc1}$, $i_{abc2}$, generator torque, rotational velocity etc., as will be known to the skilled person. On the basis of various input signals 130_1, 130_2, 140_1, 140_2 an Iq reference computation block 13 and an Id reference computation block 14 determine a current reference $I^*_{dq1}$, $I^*_{dq2}$ for the current control module 10 in each case. The purpose of each current control module 10 is to compare values of observed current $I_{dq1}$, $I_{dq2}$ (obtained by the usual transformation of the observed current $i_{abc1}$, $i_{abc2}$) and current reference $I^*_{dq1}$, $I^*_{dq2}$. Any error between these is used to generate a voltage reference $V^*_{dq1}$, $V^*_{dq2}$ which undergoes an inverse Park transformation in block 11 (to transform the input from a synchronous rotating dq0 reference frame to a stationary abc reference frame by using an appropriate transformation matrix) before being used by a subsequent pulse-width modulation (PWM) block 12 which will generate the switching signals 120_1, 120_2 for the frequency converter 20_1, 20_2 in order to control the winding currents.

FIG. 2 shows an embodiment of two current control modules 10 of a dual-stator machine. Each current control module 10 comprises a comparator 101 to compare the values of observed current $I_{dq1}$, $I_{dq2}$ and current reference $I^*_{dq1}$, $I^*_{dq2}$. Any error $\Delta I_{dq1}$, $\Delta I_{dq2}$ between these is used to generate the voltage reference $V^*_{dq1}$, $V^*_{dq2}$ for the subsequent transformation block 11. Each current control module 10 is provided with a value of observed current $I_{dq1}$, $I_{dq2}$ (obtained by the usual transformation of the observed current $i_{abc1}$, $i_{abc2}$), a reference current value $I^*_{dq1}$, $I^*_{dq2}$ (from the reference computation blocks 13, 14), and a compensation current $I_{dq\_comp1}$, $I_{dq\_comp2}$ from the other current control module 10.

In a conventional current control module, the reference voltage $V^*_{dq1}$, $V^*_{dq2}$ would be calculated by feeding the error $\Delta I_{dq1}$, $\Delta I_{dq2}$ to an appropriate feedback controller 103 such as a proportional integral (PI) controller 103. The inventive current control module 10 goes beyond the conventional reference voltage computation, and exchanges information with another current control module 10. To this end, a first current control module 10 (at the top in the diagram) receives an input compensation current value $I_{dq\_comp1}$ from a second current control module 10 (at the bottom in the diagram), and generates an output compensation current value $I_{dq\_comp2}$ to send to the second current control module 10. A compensation current value can be regarded as being essentially equal to the difference between the actual observed current and the reference current. An adder 102 adds the received input compensation current value to the locally computed difference, and the total is given to the feedback controller which computes the reference voltage. In this way, the reference voltage $V^*_{dq1}$, $V^*_{dq2}$ of a current control module 10 is no longer based only on the observed and reference currents of its own frequency converter, but also on any error current of another frequency converter.

The correction only takes effect during an actual open-circuit fault in a frequency converter. To this end, each frequency converter 20_1, 20_2 comprises a fault diagnosis module 21_1, 21_2 that generates an enable or activation signal FTC_en1, FTC_en2 to activate fault-tolerant control of the frequency converters 20_1, 20_2. For example, when an open-circuit fault occurs in the first frequency converter 20_1, the activation signal FTC_en1 will toggle from logic low ("0") to logic high ("1"). The first current control module 10 of control arrangement 1_1 then generates a non-zero output compensation current signal $I_{dq\_comp2}$ to send to the second current control module, which in this case is current control module 10 of controller 1_2.

If the frequency converter 20_2 of control arrangement 1_2 is healthy, its output compensation current $I_{dq\_comp1}$ is zero and does not have any effect on the reference voltage $V^*_{dq1}$ computed by the feedback controller 103 of the current control module 10 in the first controller 1_1.

The output compensation current signal $I_{dq\_comp1}$, $I_{dq\_comp2}$ provided by a current control module 10 is computed in a compensation current computation module 100. An embodiment of such a compensation current computation module 100 is shown in FIG. 3, showing the signals relating to the first controller 1_1. The input $\Delta I_{dq1}$ is first filtered in a low-pass filter 105 and then by a notch filter 106. The resulting filtered signal can be given a time delay by an appropriate time delay compensation unit 107. These steps can be performed continuously, whether or not there is a fault in a frequency converter. When an open-circuit fault does in fact occur in this frequency converter, the activation signal FTC_en1 generated by the fault diagnosis module allows the filtered (and optionally also delayed) compensation $I_{dq\_comp2}$ signal to be sent to the current control module 10 of the second frequency converter 20_2. Otherwise, the output compensation current $I_{dq\_comp2}$ will have a zero value and will not have any affect on the converter control signals 120_2 of the second converter 20_2.

Figure 4:
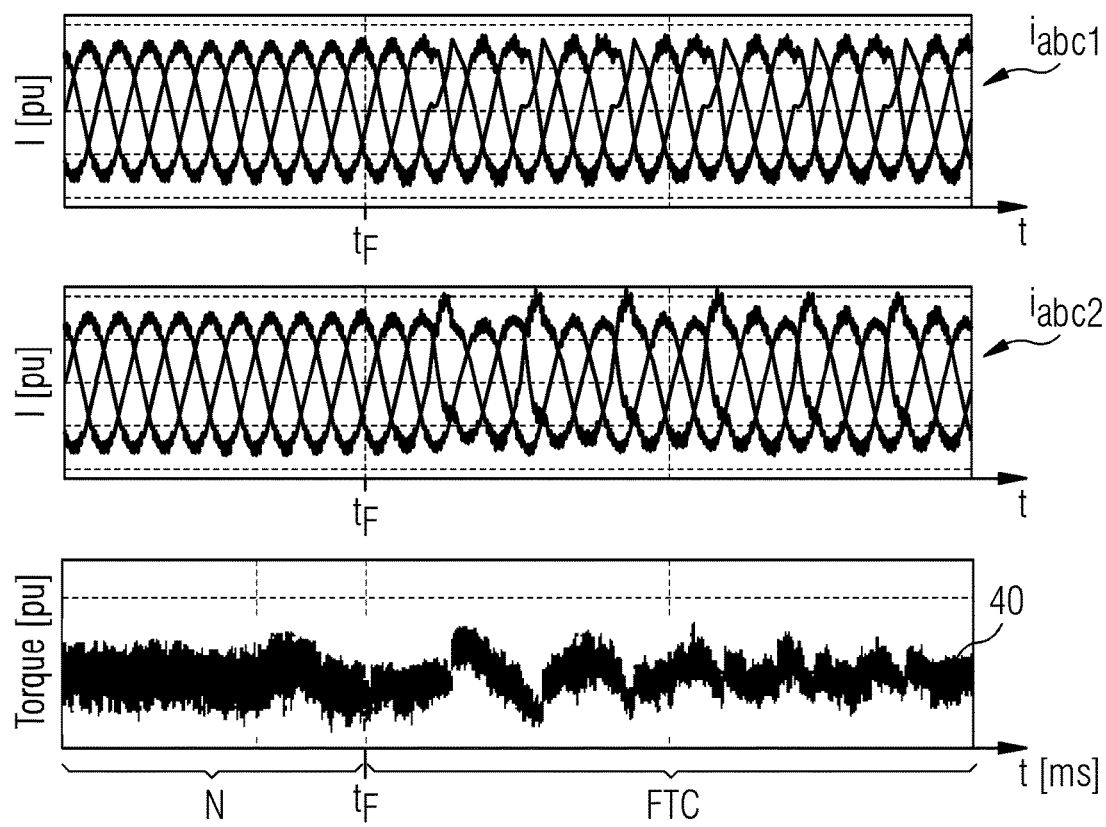

FIG. 4 shows per unit graphs of the winding currents $i_{abc1}$ of a first stator of a dual-stator PMSG, and the winding currents $i_{abc2}$ of the second stator. The diagram also shows the generator torque 40 achieved using the control arrangement according to embodiments of the invention. The experimental values were observed over a fault-free interval N and a fault-tolerant control interval FTC. During normal fault-free operation, the winding currents $i_{abc1}$, $i_{abc2}$ of each stator have an essentially steady sinusoidal form. At time $t_F$, an open-circuit fault occurs in one switch of one phase of the generator-side frequency converter of the first stator. The winding currents $i_{abc1}$ of the first stator become erratic. By activating the exchange of compensation current values between the current control modules of the control arrangement, the negative effect of the fault is cancelled out to a large extent, and the torque 40 does not exhibit any pronounced ripple following the fault. This favourably steady behaviour allows the generator to remain connected to deliver power to the grid. Of course, the generator may need to be de-rated by up to 20% of rated power, since the DC-link voltages may exhibit additional harmonics during fault-tolerant control, and the generator phase currents may assume higher maximum values.

Figure 5:
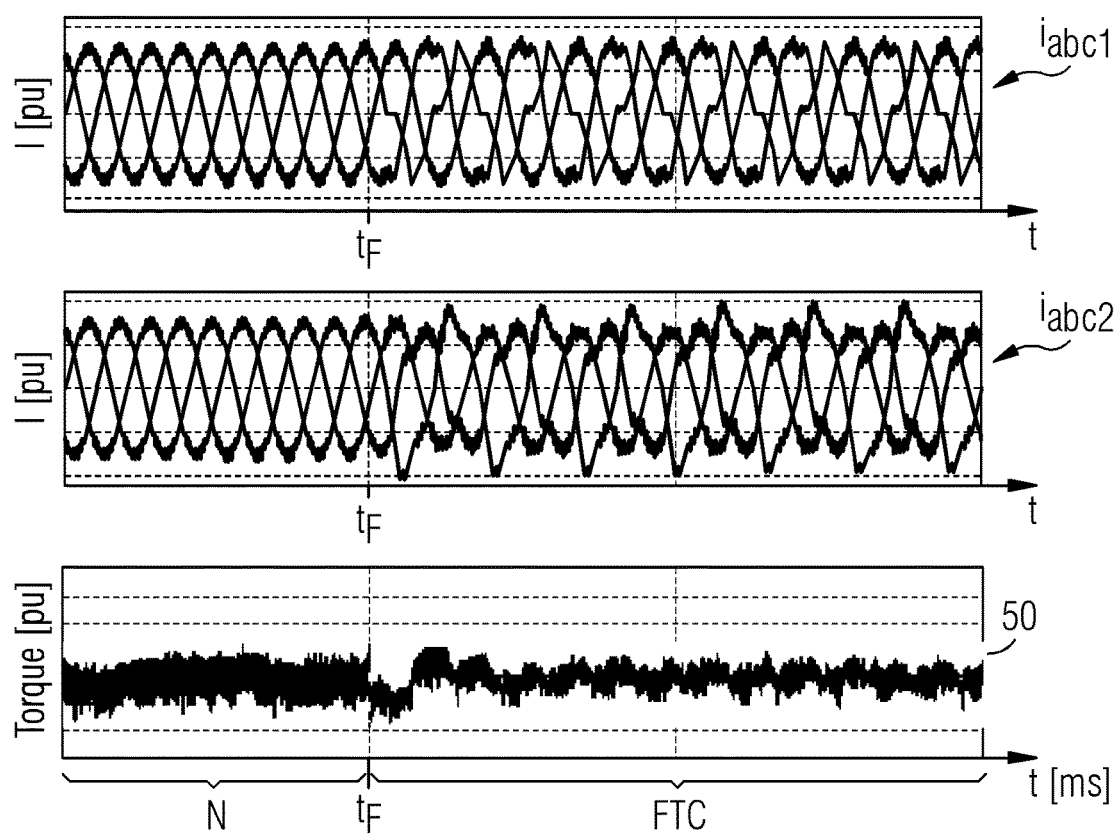

FIG. 5 also shows per unit graphs of current $i_{abc1}$, $i_{abc2}$ and generator torque 50 over a fault-free interval N and a fault-tolerant control interval FTC following open-circuit faults in both switches of one phase at time $t_F$. Here also, by activating the exchange of compensation current values between the current control modules, the negative effect of the fault is shared, and the torque 50 remains favourably steady following the fault.

Figure 6:
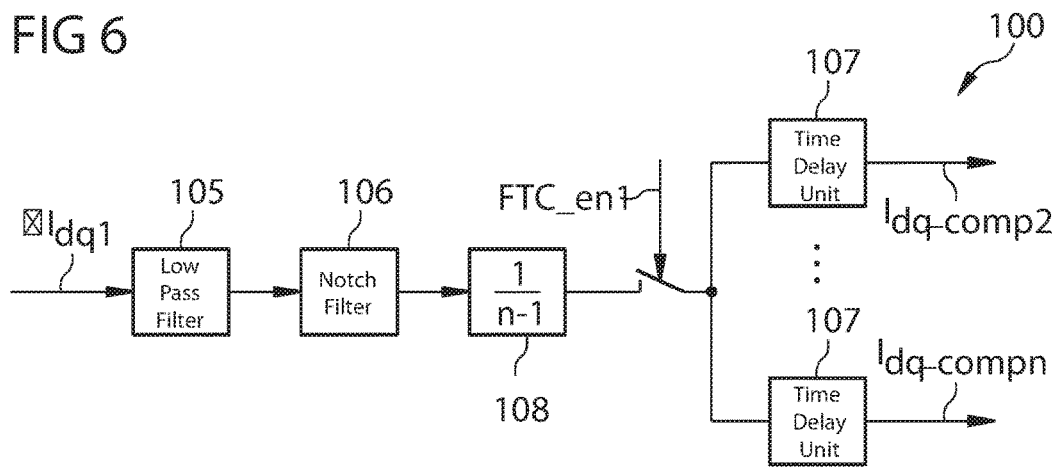
FIG. 6 shows a second embodiment of a compensation current computation module of a current control module.

A multi-stator machine may comprise more than two stators. FIG. 6 shows a second embodiment of a compensation current computation module 100 of a current control module according to embodiments of the invention for use in a machine that comprises n stators. Similarly to FIG. 3, the error current value $\Delta I_{dq1}$ is filtered in a filter arrangement 105, 106 108. Since the compensation current will be sent to n−1 current control modules, the output of the filter arrangement is divided by n−1. In the event of a fault in a frequency converter, compensation currents $I_{dq\_comp2}$, $I_{dq\_compn}$ are sent to the other n−1 current control modules. If required, the compensation current signal can have been delayed as appropriate in delay units 107, wherein the added delay may be different in each case.

Figure 7:
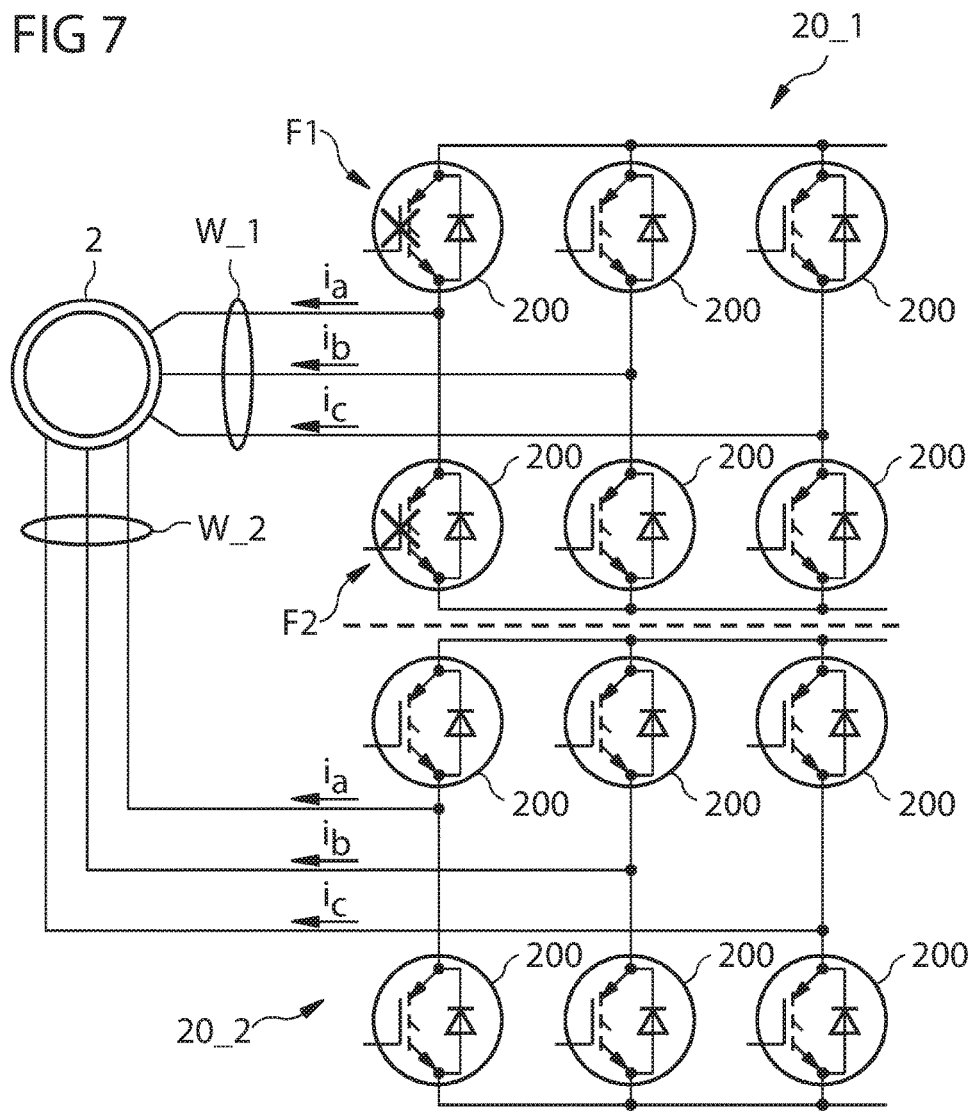
FIG. 7 shows a fault scenario for a multi-stator machine.

FIG. 7 shows a fault scenario for a multi-stator machine. For the sake of simplicity, the multi-stator machine is assumed to be a dual-stator machine with isolated neutral points and no spatial shift between windings. The diagram shows a simplified representation of two generator-side frequency converters 20_1, 20_2 of a dual-stator machine 2. Each frequency converter 20_1, 20_2 comprises an upper and lower set of three n-channel IGBTs 200, one for each winding current phase. Control signals (not shown) are applied to the gates of the IGBTs 200, and each generator-side frequency converter 20_1, 20_2 is connected via a DC link to a grid-side frequency converter (not shown). The diagram shows an open-circuit fault F1 in the upper switch of one phase, and another open-circuit fault F2 in the lower switch of the same phase. Such open-circuit faults F1, F2 involve failure of the transistor, so that current can no longer flow from collector to emitter. However, the switch diode still offers a path for the phase current in the opposite direction.

Figure 8:
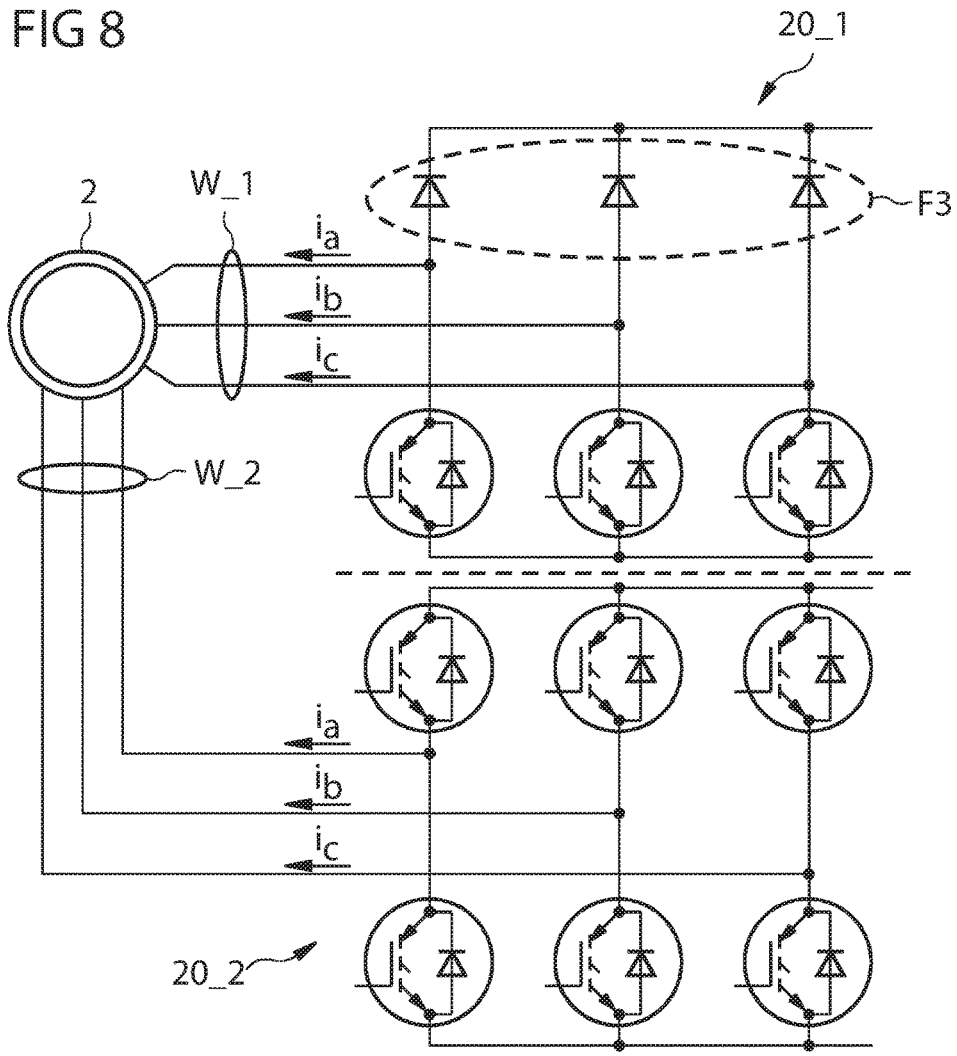
FIG. 8 shows a further fault scenario for a multi-stator machine.

FIG. 8 shows a further fault scenario for a multi-stator machine. Here, all of the upper switches for all three phases of the first converter 20_1 have failed. The functionality of the faulty converter 20_1 is restricted, and is referred to as a "half-controlled rectifier". Even with this serious fault F3, the inventive method allows the generator to continue operating with a favourably low level of torque ripple, since the disturbances to the phase currents of the faulty first converter 20_1 are compensated by introducing complementary disturbances into the phase currents of the healthy second converter 20_2.

Figure 9:
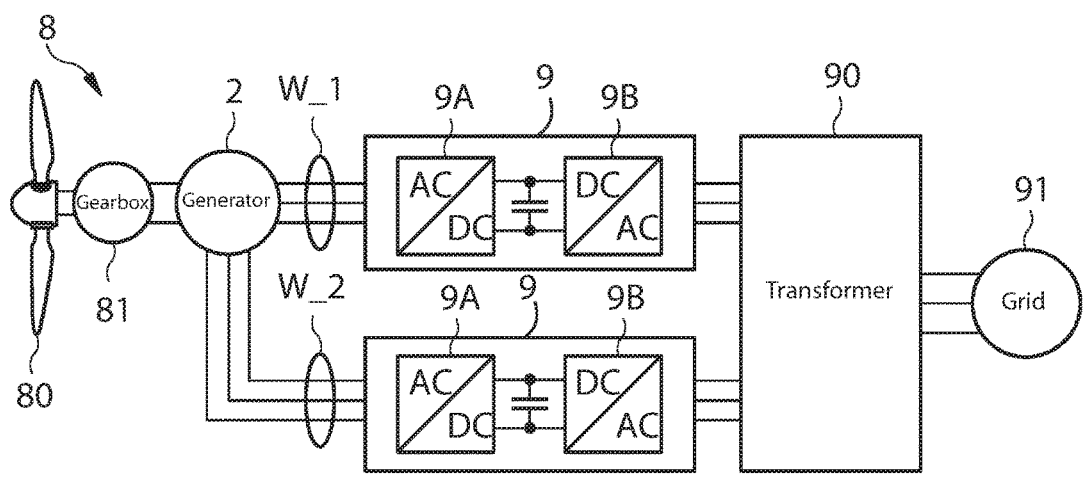
FIG. 9 shows a block diagram of a conventional wind turbine.

FIG. 9 shows a block diagram of a conventional wind turbine 8. In this very simplified diagram, the wind turbine 8 is represented by a rotor hub 80 with three blades, arranged to turn a main shaft. The main shaft is connected to a gearbox 81, which converts the slow, high-torque rotation of the main shaft into a faster rotation of a dual-stator generator 2. A control arrangement 9 for each stator comprises two DC/AC converters in a back-to-back topology, namely a generator-side converter 9A (for controlling the stator currents) connected via a DC-link to a grid-side converter 9B (for controlling the transformer currents). The control arrangement 9 is the interface between the multi-stator generator 2 and the transformer 90, allowing the output power to be fed into the grid 91.

Figure 10:
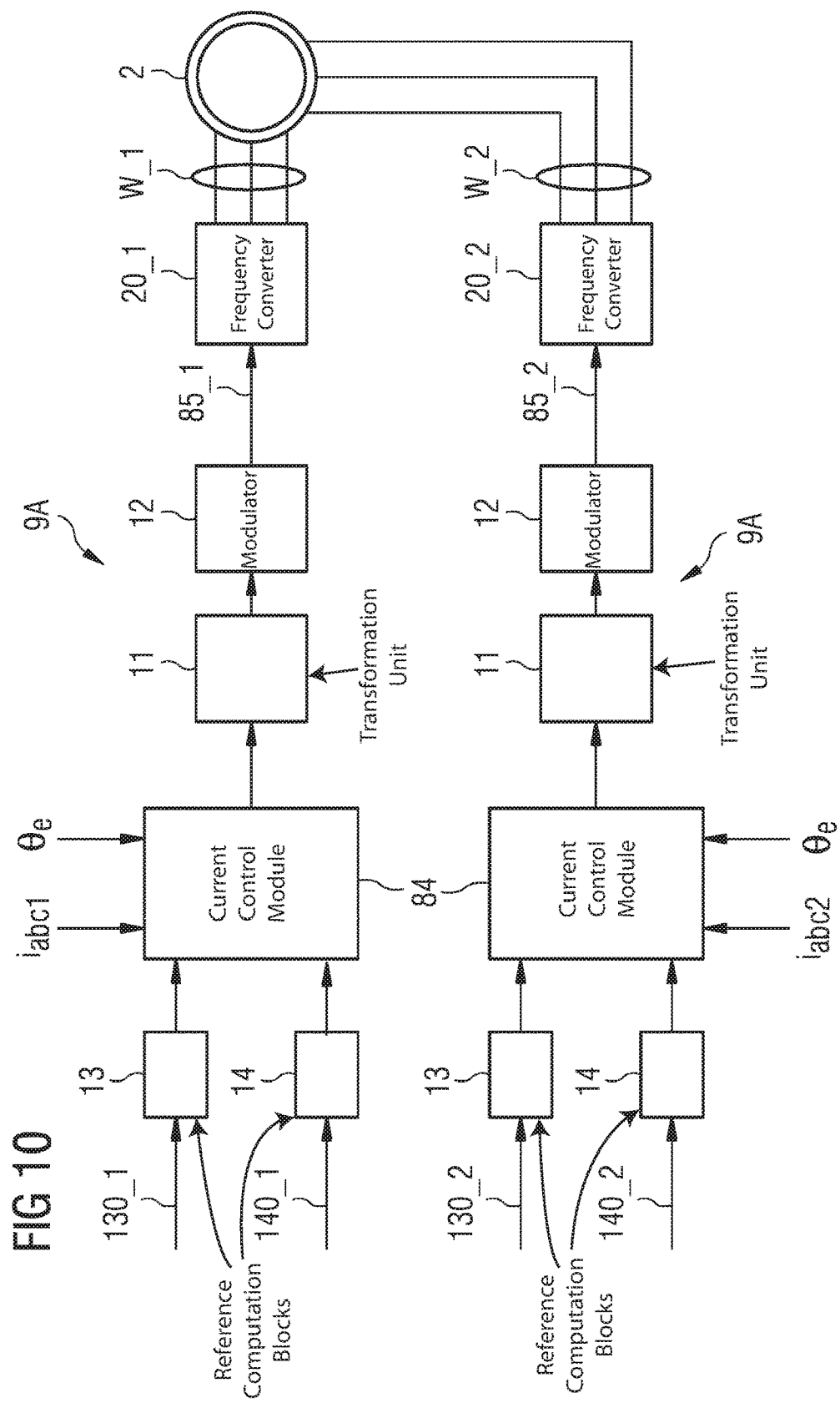
FIG. 10 shows an embodiment of a conventional control arrangement.

A block diagram of the generator-side converters 9A, 9B of the conventional control arrangement is shown in FIG. 10. Here, each generator-side converter 9A, 9B comprises reference computation blocks 13, 14; a current control module 84; a transformation unit 11 and a modulator 12. In the conventional control arrangement, there is no exchange of information between the current control modules 84. An erratic winding current, arising from an open-circuit fault F1, F2, F3 (as described in FIG. 7 or FIG. 8) in the corresponding frequency converter is not corrected or compensated. The erratic winding current(s) result in a pronounced level of torque ripple. If a fault-tolerant control is not possible, the wind turbine 8 must be disconnected from the grid 91, resulting in significant loss of revenue.

Figure 11:
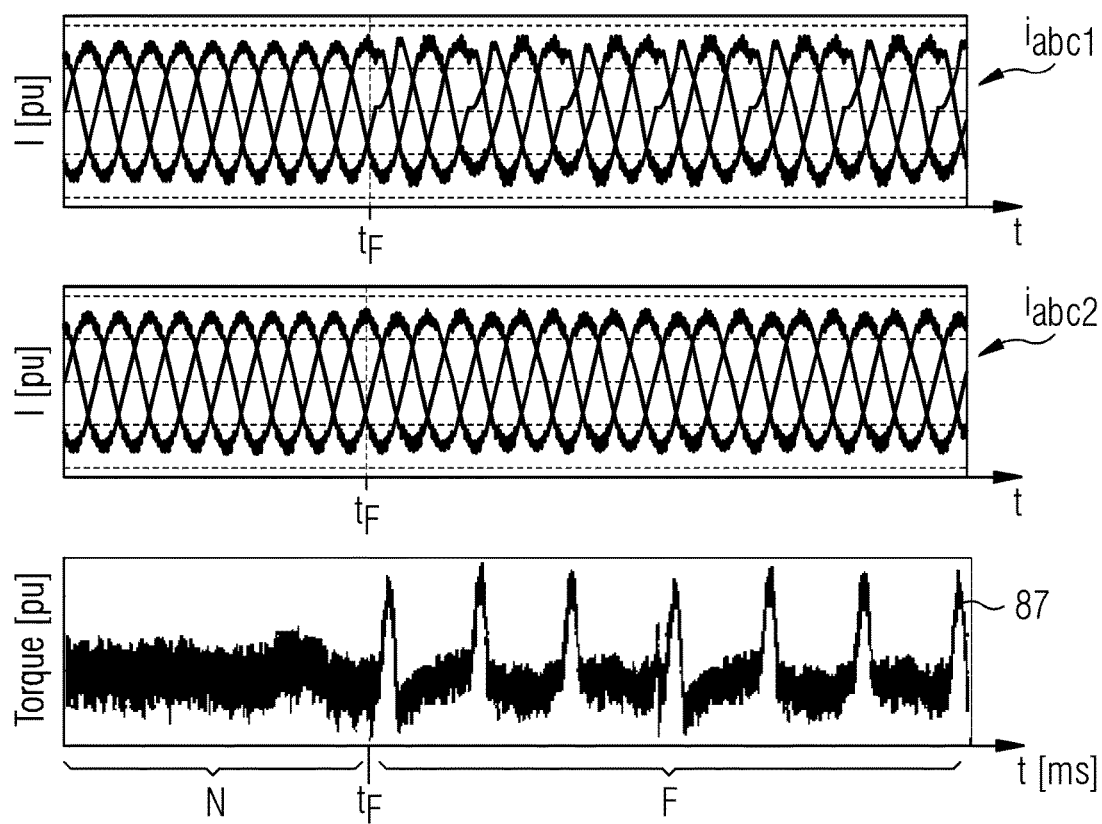
FIGS. 11 and 12 show graphs of current and torque achieved using a conventional control method.

FIG. 11 demonstrates the outcome in the absence of any fault-tolerant control. Here also, the diagram shows per unit graphs of current $i_{abc1}$, $i_{abc2}$ for the windings W_1, W_2 of a dual-stator PMSG, and the generator torque 87. The experimental values were observed over a fault-free interval N and a fault interval F commencing at time $t_F$ after an open-circuit fault in one switch of one phase in a generator-side frequency converter. The fault interval F demonstrates the outcome in the absence of any fault-tolerant control: the winding currents $i_{abc2}$ of the second stator remain steady since the generator-side frequency converter of the second stator is healthy, but the generator torque exhibits pronounced ripple as can be seen by the distinct peaks in this interval F.

Figure 12:
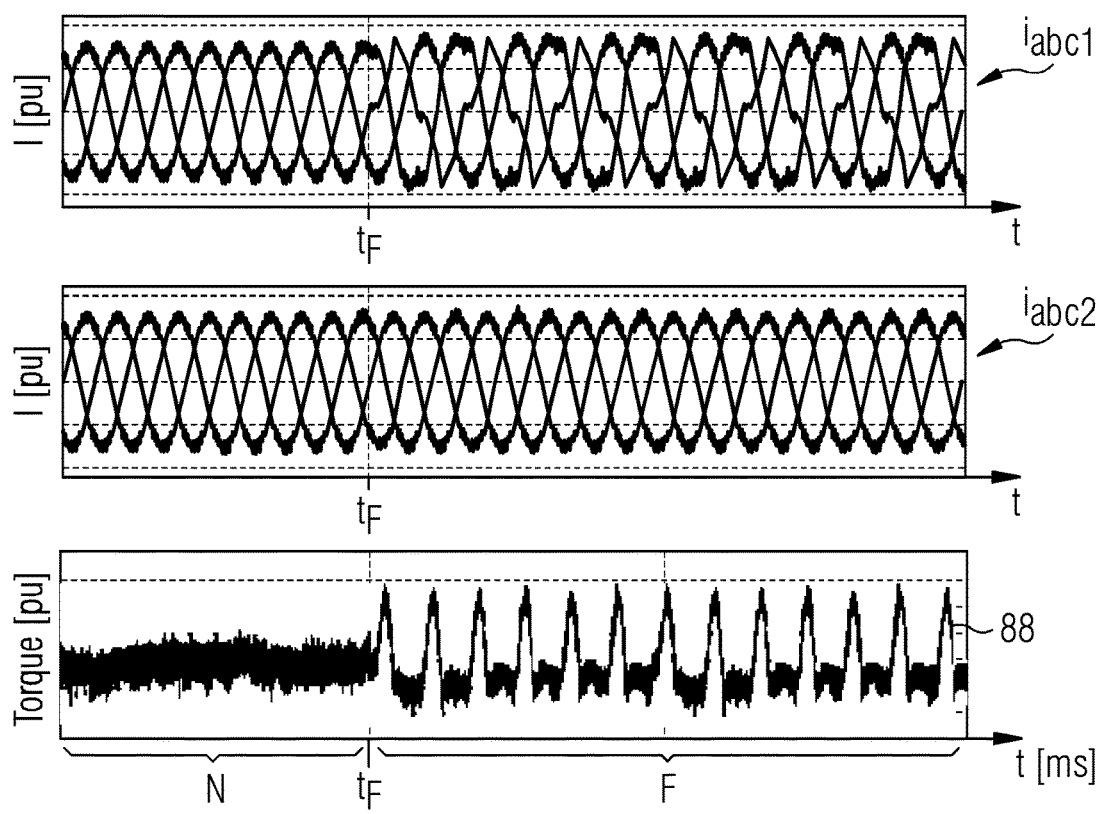

FIG. 12 is similar to FIG. 11, and shows the outcome of two open-circuit faults F1, F2 in one of the generator-side frequency converters. In this scenario, the generator torque 88 exhibits severe ripple as can be seen in the interval F.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A control arrangement of a machine having a first stator and a second stator, comprising:
a first frequency converter for the first stator and a second frequency converter for the second stator, wherein the first frequency converter has a first controller and the second frequency converter has a second controller,
wherein the first controller generates control signals for the first frequency converter based on measured current values relating to the first stator and the second controller generates control signals for the second frequency converter based on measured current values relating to the second stator, and
wherein the first controller generates a first compensation current value for the second controller on the basis of the received measured current values relating to the first stator compared with a first reference current value and the second controller generates a second compensation current value for the first controller on the basis of the received measured current values relating to the second stator compared with a second reference current value;

and a fault diagnosis module realized to detect the occurrence of an open-circuit fault in at least one of the first frequency converter and the second frequency converter, and to generate a compensation current activation signal in the event of the open-circuit fault;

wherein the first controller receives the second compensation current value from the second controller;

wherein, upon receipt of the compensation current activation signal, the first controller computes a voltage reference for a subsequent transform stage of the first controller on the basis of the measured current values and the second compensation current value received by the first controller.

2. A dual-stator machine, wherein said dual-stator machine is a dual-stator permanent magnet synchronous generator, comprising a frequency converter for each of the plurality of stators, and the control arrangement according to claim 1 for controlling the frequency converters.

3. A wind turbine comprising the dual-stator machine according to claim 2.

4. A current control module in a controller of a frequency converter assigned to one stator of a dual-stator machine, which current control module comprises:
a number of inputs for receiving a measured current value and a reference current value relating to that stator, and a comparator for determining a difference current value on the basis of the received measured current value and the received reference current value;
a compensation current computation module for computing an output compensation current value on the basis of the difference current value, wherein the output compensation current value is equal to the difference current value; and
a reference voltage computation unit realized to compute a voltage reference for a subsequent transform stage on the basis of the difference current value and an output compensation current value received from a current control module of the other frequency converter controller;
wherein the other frequency converter controller only sends a non-zero output compensation current value during an open-circuit fault;
further wherein the voltage reference is used to reduce a torque ripple caused by the open-circuit fault.

5. The current control module according to claim 4, wherein the compensation current computation module comprises a filter arrangement arranged to process the difference current value.

6. The current control module according to claim 5, wherein the filter arrangement comprises a number of adaptive filters.

7. The current control module according to claim 5, wherein the filter arrangement comprises a low-pass filter and/or a notch filter.

8. The current control module according to claim 4, wherein the compensation current computation module comprises a delay unit for introducing a time delay on the output compensation current value.

9. The current control module according to claim 4, comprising an input filter realized to filter the reference current value.

10. A method of performing fault-tolerant control of a multiple-stator machine comprising a frequency converter for each of the plurality of stators, and a controller for each frequency converter, which method comprises the steps of:
providing each controller with measured current values relating to its stator;
generating compensation current values on the basis of the measured current values received by each respective controller;
monitoring the frequency converters to detect an occurrence of an open-circuit fault in the frequency converter;
exchanging the compensation current values between the controllers in the event of the open-circuit fault;
computing a voltage reference for a transform stage of the controller on the basis of the received measured current values and the compensation current values; and
operating the multiple-stator machine according to the computed voltage reference for the transform stage to reduce a torque ripple generated by the open-circuit fault.

11. The method according to claim 10, comprising the step of generating a compensation current activation signal to enable the exchange of the compensation current values between frequency converter controllers in the event of the open-circuit fault.

12. The method according to claim 10, wherein the steps of performing fault-tolerant control are carried out during uninterrupted operation of the multi-stator machine.

13. The method according to claim 10, comprising a step of derating a power output of the multi-stator generator in the event of a fault, wherein the power output is de-rated by at most 20% of rated power.

* * * * *